July 9, 1946.  M. P. MATUSZAK  2,403,672
SEPARATION OF OLEFINS
Filed Nov. 13, 1943
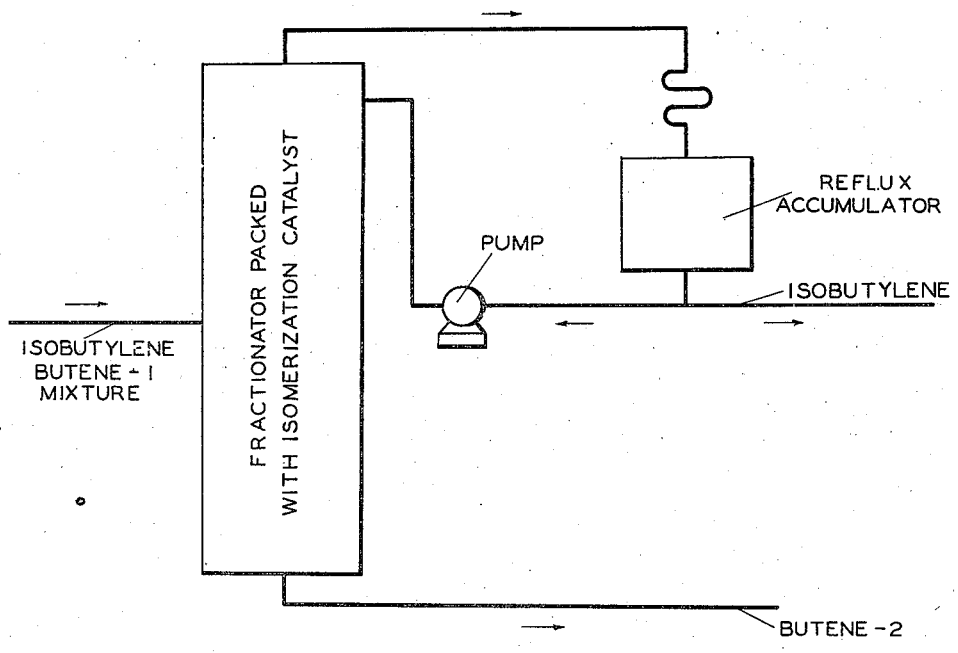
INVENTOR
M. P. MATUSZAK
BY Hudson, Young & Yinger
ATTORNEYS Patented July 9, 1946

2,403,672

UNITED STATES PATENT OFFICE 2,403,672

SEPARATION OF OLEFINS

Maryan P. Matuszak, Bartlesville, Okla., assignor to Phillips Petroleum Company, a corporation of Delaware Application November 13, 1943, Serial No. 510,185

3 Claims. (Cl. 260—683.2)

This invention relates to the treatment of mixtures of olefins of closely adjacent boiling points, more particularly to the separation of an iso-olefin from the corresponding 1-olefin, and still more particularly to the separation of isobutylene from butene-1.

For many purposes, it is advantageous or desirable to obtain a substantially pure isoolefin from a mixture containing also one or more close-boiling normal olefins, as for example, to obtain isobutylene from a mixture containing also butene-1 and perhaps butene-2. Although it is readily possible, by fractional distillation, to separate butene-2 from butene-1 and isobutylene, the separation of isobutylene from butene-1 by fractional distillation is extremely difficult and expensive because of the closeness of the boiling points. The boiling point of butene-1 is —6.1° C. and that of isobutylene is —6.6° C. Accordingly, in the past it has been necessary to resort to costly and complex azeotropic distillations, solvent extractions, and chemical separations, in order to separate these two olefins. But butene-2, the two forms of which boil at +1.0 and 3.7° C., can be readily separated from isobutylene by fractional distillation.

By the practice of this invention, a mixture of hydrocarbons which contains isobutylene and butene-1, and which may or may not contain butenes-2, is processed in a single fractionation-isomerization tower or column to separate the isobutylene from other butenes. The upper two thirds or thereabouts of the column is packed with an isomerization catalyst which is capable of effecting the isomerization of butene-1 to butenes-2 as substantially the sole reaction under the conditions maintained in the distillation column. The isobutylene is fractionally distilled from the butenes-2 and is removed as an overhead product. The butenes-2 is removed as a kettle product. The catalyst acts not only to promote the isomerization reaction, but also as packing material in the column to fractionate the butene-1 and isobutylene from the higher-boiling butenes-2. The lower part of the column is packed with a non-isomerizing packing, or it may contain other fractionating devices performing the function of fractionating plates, whereby the higher-boiling butenes-2 works its way downward and eventually passes from the column. It is undesirable to fill the lower part of the column with catalyst because of the reverse isomerization of butene-2 to butene-1 which would occur. The feed mixture comprising butene-1 and isobutylene enters the tower at a point about midway between the top and the bottom of the fractionator. The column operates at a temperature, below the critical temperature of isobutylene (approximately 293° F.), that is found most suitable for the conversion of butene-1 to butene-2. The temperature used is preferably such that isomerization of butene-1 to butenes-2 is the principal or sole reaction, and that isomerization of normal butene to isobutylene is substantially precluded. Temperatures ranging from about 150° F. to about 250° F. are preferred, although operation at lower temperatures, as low as room temperature, or at higher temperatures, say up to about 290° F., may be practiced provided the slow reaction rates at the lower temperatures or the slightly increased tendency to deactivation of the catalyst at the higher temperatures are not objectionable. The column pressure is always above atmospheric when operating at temperatures above the boiling point of the feed at atmospheric pressure. The fractionation column is provided with the means for applying heat at the bottom and for removing heat to establish refluxing at the top. The operating pressure in the column is easily adjusted to any desired level by controlling the column temperature, as is well understood in the art. The pressure is adjusted to maintain both liquid and vapor states so as to produce a suitable degree of fractionation. The size of the column and the thickness of the bed or beds of catalyst depend upon the rate of throughput of hydrocarbons and the purity of products desired. That is, the greater the degree of fractionation and the purer the isobutylene desired, the thicker must be the catalyst bed in the fractionating column. If the thickness of the beds in the column remains constant, and a purer overhead product of isobutylene is desired, it is necessary to use a higher reflux ratio which will require a fractionator that is larger in cross-sectional area.

Any suitable solid catalyst which is effective under vapor-liquid conditions, such as the catalysts mentioned in my copending applications Serial No. 441,705 filed May 4, 1942, and Serial No. 467,873 filed December 4, 1942, may be used. Among preferred catalysts are those comprising black chromium oxide; other especially suitable catalysts include granular magnesia, chromia and brucite. Ordinarily, a catalyst effecting olefin isomerization without appreciable change in the carbon skeletal structure is preferred.

An advantage of this invention is the removal of butene-2 from the unisomerized butene-1 as rapidly as the butene-2 is formed. This is accomplished by the fractionation that is taking place in the presence of the catalyst. This keeps the concentration of butene-2 low in the presence of butene-1, and consequently promotes the isomerization reaction according to the following equation for the equilibrium constant:

$$K = \frac{C_{butene-1}}{C_{butene-2}}$$

The lower section of the tower not only provides a means for separating the isobutylene from the butene-2 formed from butene-1 but also provides for the separation of the isobutylene from any butene-2 present in the feed.

By fractional distillation of the mixture in the same column in which the isomerization occurs, the number of treatments to produce nearly pure isobutylene is decreased below that which would be required if the isomerization and the fractionation occurred in separate chambers. That is, by the practice of this invention it is theoretically possible to produce any degree of purity of isobutylene desired as an overhead product and almost any purity of butene-2 as a kettle product. In contrast, if the isomerization and the fractionation are conducted in separate chambers, the isomerization reaction can only reach equilibrium between the butene-2 and butene-1 present, and several successive treatments may be required to produce a very pure grade of isobutylene; in addition, this method almost necessitates the removal of any butene-2 before the feed mixture comprising butene-1 and isobutylene is admitted to the isomerization chamber.

The accompanying drawing, which is self-explanatory, portrays an arrangement of equipment useful in carrying out the present invention.

The process of this invention is preferably applied to the separation of isobutylene from butene-1. It is not equally applicable to the separation of an isoolefin having more than four carbon atoms per molecule from the corresponding 1-olefin because such isoolefin itself undergoes isomerization; for example, isoamylene (2-methyl-butene-1) is isomerized to trimethylethylene (2-methylbutene-2).

Attention is directed to the copending application of H. E. Drennan, Serial No. 459,589 filed September 24, 1942, which describes the separate isomerization of butene-1 to butene-2 and fractional distillation to separate the isobutylene.

As used herein the terms "butene-2" and "butenes-2" are intended to include either the single 2-olefin or a mixture of the isomeric 2-olfins.

Since the invention may be practiced otherwise than as specifically described, and since minor variations and modifications of it will be obvious to those skilled in the art, it should not be restricted otherwise than as specified in the appended claims.

I claim:

1. The method of separating isobutylene from butene-1 which comprises introducing a feed containing said isobutylene and butene-1 into a fractionation-isomerization column packed with a solid catalyst which is capable of effecting the isomerization of butene-1 to butenes-2 under conditions maintained in the column, passing the feed over the solid catalyst under conditions of temperature and pressure such that liquid and vapor phases are maintained and such that the catalytic conversion of butene-1 to butenes-2 is substantially the sole reaction without substantially affecting the isobutylene, removing isobutylene as an overhead product and removing butenes-2 as a kettle product by fractional distillation in the single fractionation-isomerization column.

2. The method of claim 1 wherein the temperature of the fractionation-isomerization column is maintained between 150° F. and 250° F.

3. The method of separating isobutylene from butene-1 which comprises introducing a feed containing isobutylene and butene-1 into a fractionation-isomerization column wherein the upper part of said column is packed with a solid catalyst capable of effecting the isomerization of butene-1 to butenes-2 and functions both to catalyze said isomerization and to fractionate butenes-2 from the isobutylene and butene-1 and the lower part of said column is provided with a non-catalytic fractionating means functioning only to separate butenes-2 as a bottoms product, passing the feed over the solid catalyst under conditions of temperature and pressure such that liquid and vapor phases are maintained and such that the catalytic conversion of butene-1 to butenes-2 is substantially the sole reaction without substantially affecting the isobutylene, removing isobutylene as an overhead product and removing butenes-2 as a kettle product by fractional distillation in the single fractionation-isomerization column.

MARYAN P. MATUSZAK.

Certificate of Correction

Patent No. 2,403,672.  July 9, 1946.

MARYAN P. MATUSZAK

It is hereby certified that error appears in the printed specification of the above numbered patent requiring correction as follows: Column 4, line 8, after the word and period "claims." insert the following paragraph—

*This application is a continuation-in-part of my prior and copending application, Serial No. 441,705, filed May 4, 1942.* and that the said Letters Patent should be read with this correction therein that the same may conform to the record of the case in the Patent Office.

Signed and sealed this 29th day of October, A. D. 1946.

[SEAL]

LESLIE FRAZER,
*First Assistant Commissioner of Patents.*